(12) United States Patent
Kondo (10) Patent No.: US 6,396,954 B1
(45) Date of Patent: May 28, 2002

(54) APPARATUS AND METHOD FOR RECOGNITION AND APPARATUS AND METHOD FOR LEARNING

(75) Inventor: Tetsujiro Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/125,717

(22) Filed: Aug. 24, 1998

Related U.S. Application Data (63) Continuation of application No. PCT/JP97/04755, filed on Dec. 22, 1997.

(30) Foreign Application Priority Data

Dec. 26, 1996 (JP) ............................................. 8-347312

(51) Int. Cl.[7] ............................ G06K 9/00; G06K 9/36; G06K 9/46; G06K 9/62; G06K 7/00
(52) U.S. Cl. ........................ 382/224; 382/116; 382/118; 382/159; 382/160; 382/190; 382/209; 382/284; 707/6; 707/100; 707/102
(58) Field of Search ................................. 382/116, 118, 382/203, 224, 181, 190, 115, 159, 160, 209, 225, 227, 284; 707/6, 1, 7, 100, 102

(56) References Cited

U.S. PATENT DOCUMENTS

| | | | | |
|---|---|---|---|---|
| 4,825,362 A | * | 4/1989 | Minami et al. ............. | 709/233 |
| 4,937,869 A | * | 6/1990 | Iwahashi et al. ............ | 704/254 |
| 4,965,725 A | * | 10/1990 | Rutenberg ................... | 382/224 |
| 4,975,969 A | * | 12/1990 | Tal ............................. | 382/116 |
| 4,991,216 A | * | 2/1991 | Fujii et al. .................. | 704/254 |
| 5,522,011 A | * | 5/1996 | Epstein ........................ | 704/222 |
| 5,561,718 A | * | 10/1996 | Trew et al. .................. | 382/118 |
| 5,749,072 A | * | 5/1998 | Mazurkiewicz et al. .... | 704/275 |

(List continued on next page.)

FOREIGN PATENT DOCUMENTS

| | | |
|---|---|---|
| DE | 44 36 692 A1 | 4/1995 |
| JP | 2-262199 | 10/1990 |
| JP | 3-129400 | 6/1991 |
| JP | 06-301393 A | 10/1994 |
| JP | 07-028490 A | 1/1995 |
| JP | 08-187368 A | 7/1996 |
| JP | 9-134193 | 5/1997 |

OTHER PUBLICATIONS

Wagner T. et al: "Multi–Sensorial Inputs For The Identification Of Persons With Synergetic Computers" Proceedings of the International Conference On Image Processing (ICIP), US Los Alamitos, IEEE Comp. Soc. Press, vol. Conf. 1, 1994, pp. 287–291 XP000522640.

(List continued on next page.)

Primary Examiner—Leo Boudreau
Assistant Examiner—Daniel G. Mariam
(74) Attorney, Agent, or Firm—Frommer Lawrence & Haug LLP; William S. Frommer; Darren M. Simon (57) ABSTRACT

Different types of data including voice data of a user, image data produced by picturing the mouth of the user, and ambient noise data are provided through an input unit 10. Those data are analyzed by preprocessors 20 to 23 respectively to determine characteristic parameters. In a classification data constructing unit 24, classification data is constructed from the characteristic parameters and transferred to a classification unit 25 for classification. Meanwhile, an integrated parameter constructing unit 26 constructs integrated parameters from the characteristic parameters provided by the preprocessors 20 to 23. An adaptivity determining unit 27 selects a table corresponding to the class determined by the classification unit 25. From the standard parameters saved in the table and the integrated parameter from the integrated parameter constructing unit 26, the voice emitted by a user is recognized. Accordingly, the accuracy of the voice recognition will be increased.

12 Claims, 9 Drawing Sheets

U.S. PATENT DOCUMENTS

| | | | | |
|---|---|---|---|---|
| 5,754,681 A | * | 5/1998 | Watanabe et al. | 382/159 |
| 5,761,329 A | * | 6/1998 | Chen et al. | 382/116 |
| 5,859,925 A | * | 1/1999 | Yaeger et al. | 382/158 |
| 5,956,463 A | * | 9/1999 | Patrick et al. | 704/232 |
| 5,983,186 A | * | 11/1999 | Miyazawa et al. | 704/275 |
| 6,023,529 A | * | 2/2000 | Ilan et al. | 382/186 |
| 6,064,323 A | * | 5/2000 | Ishii et al. | 340/995 |

OTHER PUBLICATIONS

Silbee P. L.: "Sensory Integration In Audiovisual Automatic Speech Recognition" Record of the Asilomar Conference On Signals, Systems and Computers, US, Los Alamitos, IEEE Comp> Soc. Press, vol. Conf. 28, 1995, pp. 561–565 XP000533615.

Jennings D. L. et al: "Enhancing Automatic Speech Recognition With An Utrasonic LIP Motion Detector" Proceedings of the International Conference On Acoustics. Speech And Signal Processing (ICASSP), US, New York, IEEE, 1995, pp. 868–871 XP000658132.

* cited by examiner

FIG.9

APPARATUS AND METHOD FOR RECOGNITION AND APPARATUS AND METHOD FOR LEARNING

This is a continuation of copending International Application PCT/JP97/04755 having an international filling date of Dec. 22, 1997.

TECHNICAL FIELD

The present invention relates to an apparatus and a method for recognition and an apparatus and a method for learning. More particularly, the present invention relates to an apparatus and a method for recognition and an apparatus and a method for learning in which in recognizing e.g. sounds and objects, other data is utilized as well as their audio and video data to increase the recognition accuracy.

BACKGROUND ART

In a conventional voice recognition apparatus for recognizing voice sounds, voice data picked up by a microphone is (acoustically) analyzed and an analyzed result is used to recognize the voice emitted by a user.

However, such a conventional voice recognition apparatus utilizes the analyzed result from the voice data picked up by the microphone for voice recognition, whereby its recognition accuracy will be limited to a certain level.

It should be understood that not only the voice data picked up by a microphone but also other factors such as the expression and the movement of the mouth of a subject are notable and thus concerned for recognizing the voice of the subject.

The voice recognition apparatus is normally used under hostile conditions where different types of noise are received but not in a particular circumstance, e.g. a sound-proof chamber, where the voice of a subject only can be picked up by a microphone. In particular, a renovated navigation system may be equipped with such a voice recognition apparatus which however receives unwanted noise sounds, including sounds of a CD (compact disk) player, an engine, and an air-conditioner mounted in a vehicle, other than the voice of a subject to be recognized. Since it is very difficult to remove noise sounds from the voice data, the voice recognition has to deal with the noise sounds for improving its accuracy.

It is also common in the conventional voice recognition apparatus that the voice data picked up by a microphone is processed by a specific manner to determine characteristic parameters and the voice recognition is carried out by calculating the distance between the characteristic parameters plotted in a parameter space. As a rule, the characteristic parameters which are essential for the voice recognition are varied depending on the conditions where the voice recognition apparatus is set.

DISCLOSURE OF THE INVENTION

The present invention is directed towards overcoming the foregoing drawbacks and its object is to increase the recognition accuracy of a recognition apparatus for recognizing voice or other factors.

A recognition apparatus, as defined in claim 1, comprises: a first classifying means for classifying different types of input data into classes depending on their characteristics; an integrated parameter constructing means for constructing an integrated parameter through integrating the different types of input data; a standard parameter saving means for saving tables, each table carrying standard parameters and assigned to one of the classes determined by the first classifying means; and a recognizing means for recognizing a given subject using the integrated parameter and the standard parameters listed in the table assigned to the class determined by the first classifying means.

A recognition method, as defined in claim 5, comprises the steps of: classifying different types of input data into classes depending on their characteristics and constructing an integrated parameter through integrating the different types of input data; and recognizing a given subject using the integrated parameter and a table carrying standard parameters and assigned to one of the classes determined by the classification.

A learning apparatus, as defined in claim 6, comprises: a first classifying means for classifying different types of input data into classes depending on their characteristics; an integrated parameter constructing means for constructing an integrated parameter through integrating the different types of input data; and a classifying means for classifying the integrated parameters according to the class determined by the first classifying means.

A learning method, as defined in claim 9, comprises the steps of: classifying different types of input data into classes depending on their characteristics and constructing an integrated parameter through integrating the different types of input data; and classifying the integrated parameters according to the class determined by the classification.

In the recognition apparatus defined in claim 1, the first classifying means classifies the different types of input data into classes depending on their characteristics and also, the integrated parameter constructing means constructs an integrated parameter through integrating the different types of input data. The standard parameter saving means includes tables, each table carrying standard parameters and assigned to one of the classes determined by the first classifying means. The recognizing means thus recognizes a given subject using the integrated parameter and the standard parameters listed in the table assigned to the class determined by the first classifying means.

In the recognition method defined in claim 5, different types of input data are classified into classes depending on their characteristics and an integrated parameter is constructed through integrating the different types of input data. Then, a given subject can be recognized using the integrated parameter and a table carrying standard parameters and assigned to one of the classes determined by the classification.

In the learning apparatus defined in claim 6, the first classifying means classifies different types of input data into classes depending on their characteristics and the integrated parameter constructing means constructs an integrated parameter through integrating the different types of input data. The classifying means also classifies the integrated parameters according to the class determined by the first classifying means.

In the learning method defined in claim 9, different types of input data are classified into classes depending on their characteristics and an integrated parameter is constructed by integrating the different types of input data. The integrated parameters are then classified according to the class determined by the classification.

BEST MODE FOR CARRYING OUT THE INVENTION

Figure 1:
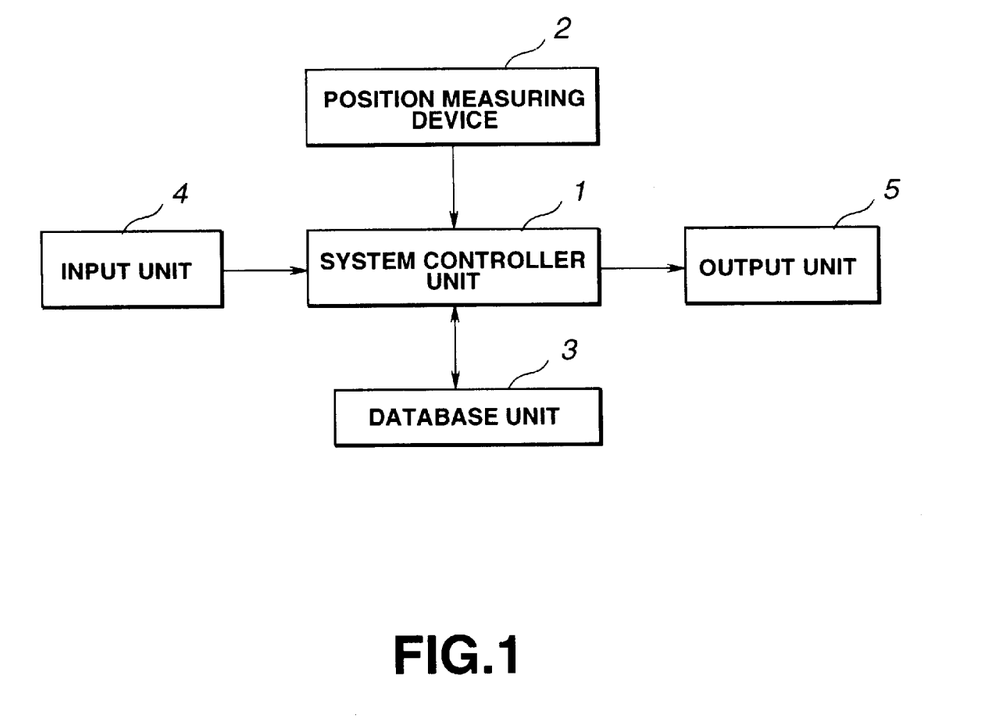
FIG. 1 is a block diagram showing an arrangement of a navigation system according to the present invention.

FIG. 1 illustrates an arrangement of a navigation system according to the present invention.

The navigation system which may be provided in a vehicle comprises a system controller unit 1, a position measuring device 2, a database device 3, an input device 4, and an output device 5, and can be controlled by operating e.g. button switches or through speech inputs in a dialogue mode. The navigation system may be used as a portable type.

The system controller unit 1 receives and transmits data with each block in the system to control the entire action of the system. The position measuring device 2 receives an electrical wave from a GPS (Global Positioning System) satellite and measures the current position with a measuring device such as gyroscope or a vehicle speed sensor. The database device 3 holds (saves) map information in an electronic format and other relevant data required for navigation which can be retrieved in response to a command from the system controller unit 1 and supplied to the system controller unit 1.

The input device 4 includes button switches or a joystick for operating the navigation system, a microphone for entering voice data, a CCD (Charge Coupled Device) camera for picturing a user, an acceleration sensor for detecting vibration of the vehicle, sensors for measuring the moisture and the temperature, and other relevant sensors. An output signal of the input device 4 operated by the button switches or the joystick is transferred to the system controller unit 1. Also, the input device 4 includes a voice recognition device for recognizing voice components in an input sound and delivering its resultant data to the system controller unit 1.

The output device 5 includes, for example, a liquid crystal display monitor or a CRT (Cathod Ray Tube) for displaying an image and the like, a speaker(s) for emitting speech and the like, and a voice mixer device for generating a composite sound from text data, and can control a display of map information or the current position and an output of speech. The output device 5 when receiving a text data from the system controller unit 1 can combine it with its corresponding speech in the voice mixer device.

In the navigation system having the above mentioned arrangement, when the user speeches the name of a location as the destination, its voice is recognized by the voice recognition device mounted in the input device 4 and its voice data is transferred to the system controller unit 1. The system controller unit 1 upon receiving the voice data of the destination recognizes the current position from an output of the position measuring device 2 and accesses the map information saved in the database device 3 to determine a route from the current position to the destination. The system controller unit 1 transfers the route together with its relevant map information to the output device 5 for display and simultaneously, delivers to the voice mixer device of the output device 5 a voice data for instructing the route.

This allows the user to arrive at the destination without difficulty.

Figure 2:
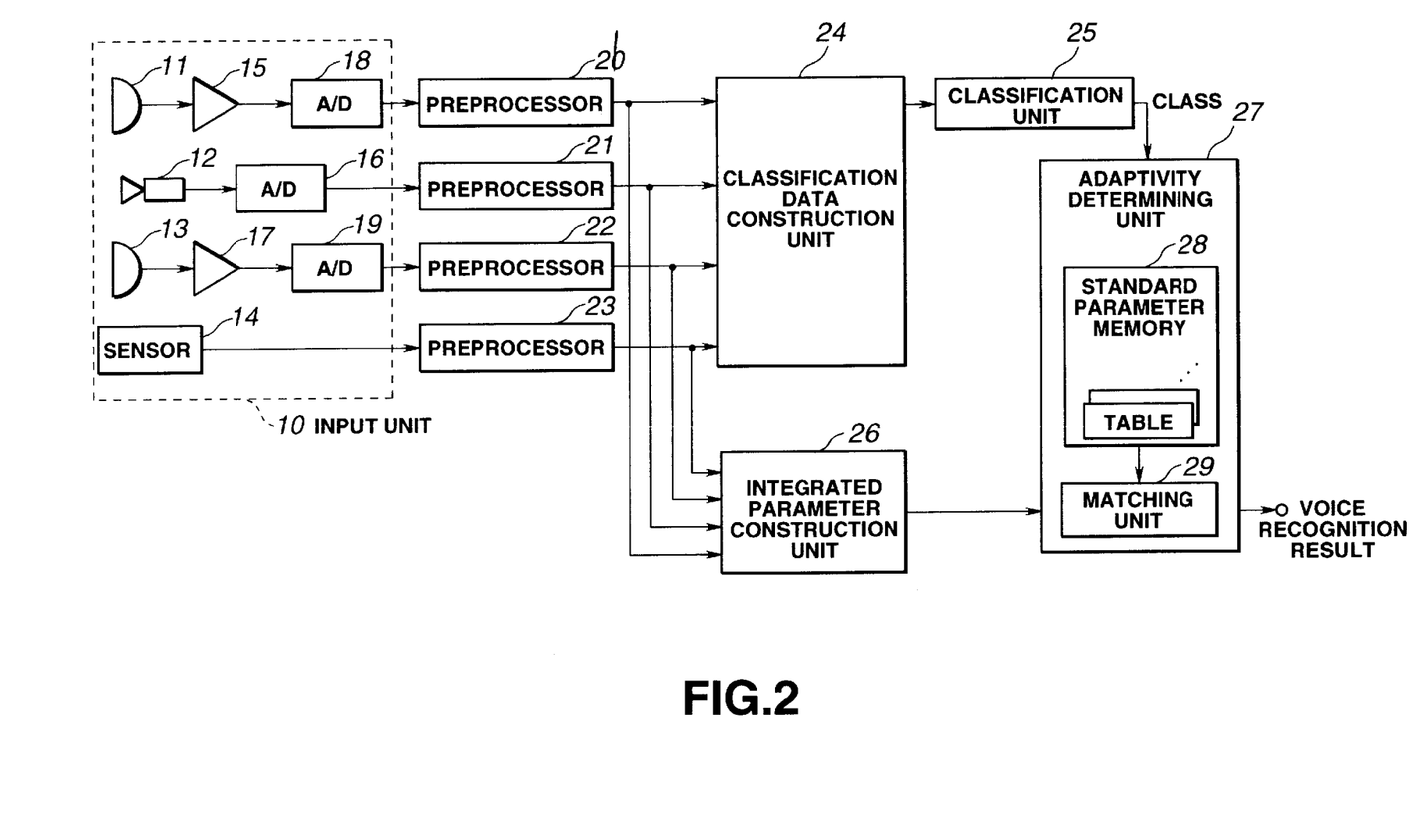
FIG. 2 is a block diagram of an arrangement of a first embodiment of a voice recognition apparatus according to the present invention.

FIG. 2 illustrates an arrangement of a first embodiment of the voice recognition device mounted in the input device 4 shown in FIG. 1.

An input unit 10 comprises a microphone 11, a CCD camera 12, another microphone 13, a sensor 14, an amplifier 15, an A/D converter 16, another amplifier 17, and A/D converters 18 and 19 and can release various input data used for recognition of voices of the user as a driver.

More specifically, the microphone 11 may be of a directional type and pointed to the user who is the driver. The voice of the user is picked up mostly by the microphone 11. The voice picked up by the microphone 11 is converted to an audio signal which is then amplified by the amplifier 15 and transferred to the A/D converter 18. In the A/D converter 18, the audio signal of analog form supplied from the amplifier 15 is sampled by a given sampling clock and quantized to particular quantizing steps so that it can be converted to a digital signal of audio data. The audio data is transmitted from the A/D converter 18 to a preprocessor 20.

The CCD camera 12 is located to picture the mouth of the user. The mouth of the user pictured by the CCD camera 12 is converted to a video signal which is transferred to the A/D converter 16. The A/D converter 16 like the A/D converter 18 converts the video signal of analog form to an image data which is then transmitted to a preprocessor 21.

The microphone 13 may be of non-directional type for receiving sounds other than the voice of the user. For example, picked up are ambient sounds from an engine, from a radio receiver or a CD player mounted in the vehicle, and from an air-conditioner, and when a window is opened, external noise. The sounds picked up by the microphone 13 is processed by the amplifier 17 and the A/D converter 19 in the same manner as of the amplifier 15 and the A/D converter 18. As a result, the sounds are converted to an audio data and supplied to a preprocessor 22.

The sensor 14 may be an acceleration sensor for detecting vibration of the vehicle or a sensor for measuring the moisture or the temperature and its output is transferred to a preprocessor 23. An output of the acceleration sensor represents the level (or amplitude) of noise caused by the vibration of the vehicle. An output of the sensor for measuring the moisture or the temperature determines whether it rains or not. If it is raining, the level of its sound is calculated.

In the preprocessors 20 to 23, their respective data received are analyzed to determine characteristic parameters indicative of characteristics of the data.

More particularly, the preprocessors 20 and 22 calculate from the audio data zero-cross values, power levels at each frequency band, linear predictive coefficients, cepstrum factors, and other parameters on the basis of each audio frame as a time unit. They are transmitted as the characteristic parameters to a classification data construction unit 24 and an integrated parameter construction unit 26.

Figure 3:
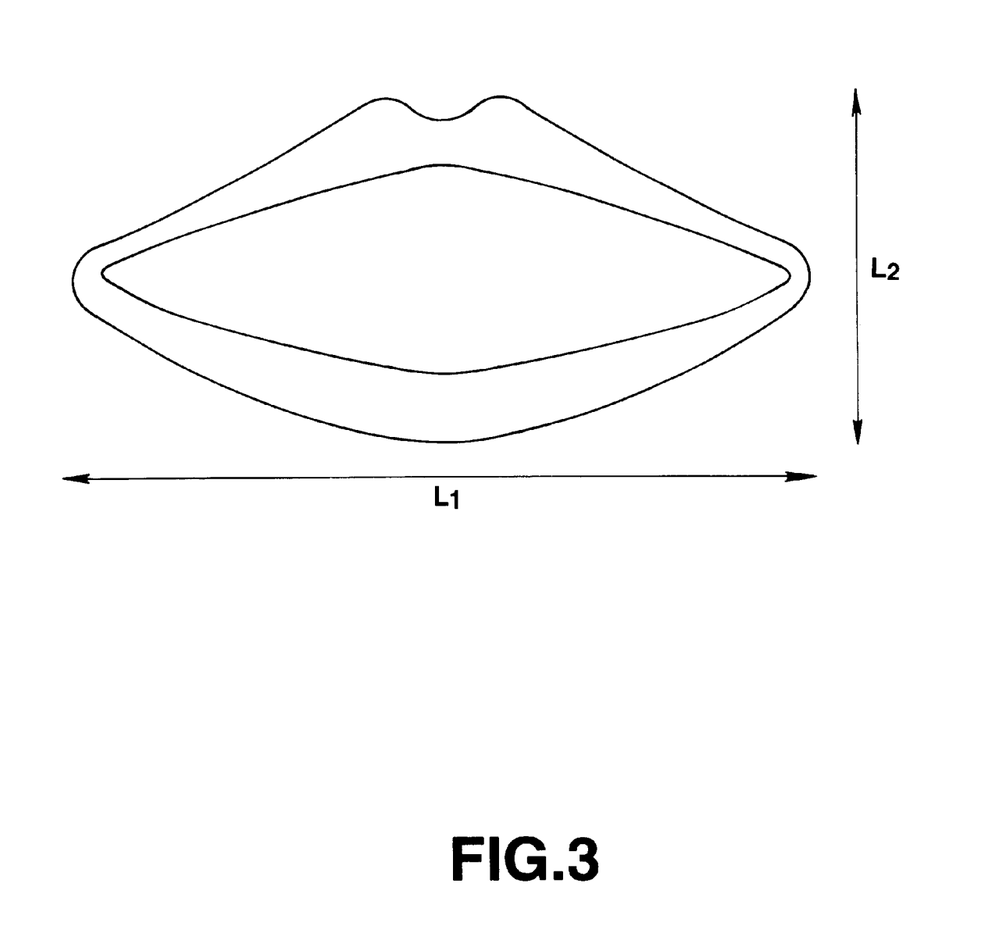
FIG. 3 is a diagram explaining a process in a preprocessor unit 21.

In the preprocessor 21, the horizontal length $L_1$ and the vertical length $L_2$ of the mouth shown in FIG. 3 may be calculated from the video data representing the mouth of the user and a ratio of $L_1/L_2$ is supplied as a characteristic parameter to the classification data construction unit 24 and the integrated parameter construction unit 26. Alternatively, the preprocessor 21 may calculate from the video data of the mouth of the user a motion vector, edge values, and DCT (discrete cosign transform) coefficients which are then transferred as the characteristic parameters to the classification data construction unit 24 and the integrated parameter construction unit 26.

In the preprocessor 23, the characteristic parameters including the level (or amplitude) of noise generated by the vibration of the vehicle and the level of raining sound may be determined through analyzing the output of the sensor 14. Those parameters are also transferred to the classification data construction unit 24 and the integrated parameter construction unit 26.

From the classification data construction unit 24, at least some of the characteristic parameters received from the preprocessors 20 to 24 are delivered as classification data used for classification to a classification unit 25. In the classification unit 25, the classification data received from the classification data construction unit 24 are classified depending on their pertinent characteristics.

More specifically, the classification unit 25 delivers a value assigned to a pattern of the characteristic parameters of the classification data as the class of classification data to an adaptivity determining unit 27.

Assuming that a characteristic parameter is expressed by A bits and a classification data consists of a B number of the characteristic parameters, the number of patterns of the characteristic parameters of the classification data is $(2^A)^B$. Accordingly, when either A or B is great, the number of classes becomes enormous and its handling will hence be speeded up with much difficulty.

For reducing the number of bits of the characteristic parameters of each classification data, a proper technique such as ADRC (Adaptive Dynamic Range Coding) is used as the preprocess before the classification.

The ADRC process starts with detecting the highest (referred to as a maximum characteristic parameter hereinafter) and the lowest (referred to as a minimum characteristic parameter hereinafter) of the B characteristic parameters of the classification data. Then, a difference DR between the maximum characteristic parameter MAX and the minimum characteristic parameter MIN is calculated (=MAX−MIN) and treated as a local dynamic range in the classification data. According to the dynamic range DR, each characteristic parameter of the classification data is quantized to a numeral of C bits which is smaller than A bits. More specifically, the minimum characteristic parameter MIN is subtracted from each characteristic parameter of the classification data and a resultant difference is divided to $DR/2^C$.

Accordingly, each of the characteristic parameters of the classification data is denoted in C bits. If C=1, the number of patterns of the B characteristic parameters is $(2^1)^B$ which is considerably smaller than the number without the ADRC process.

In respect of minimizing the number of patterns of the characteristic parameters of the classification data, it is desirable that B, the number of the characteristic parameters determining the classification data, is not a large number. However, if B is too small, the result of the classification will be unfavorable. It is thus essential to determine B over balancing the relevant numbers.

The integrated parameter construction unit 26 allows at least some of the characteristic parameters received from the preprocessors 20 to 24 to be integrated (or gathered) and delivered as an integrated parameter to the adaptivity determining unit 27.

The integrated parameter may be a group of the characteristic parameters which are identical to those of the classification data or a group of other characteristic parameters than the characteristic parameters of the classification data.

The adaptivity determining unit 27 comprises a standard parameter memory 28 and a matching block 29 and when receiving a class from the classification unit 25 or an integrated parameter from the integrated parameter construction unit 26, selectively extract from the standard parameter memory 28 a standard parameter table which carries corresponding standard parameters to the class received from the classification unit 25.

More particularly, the standard parameter memory 28 holds a corresponding number of the standard parameter tables to the classes, each standard parameter table contains a group of standard parameters, e.g. for sound elements, which can be determined by learning of a learning apparatus (FIG. 4) described later. In the matching block 29, a corresponding one of the standard parameter tables to the class received from the classification unit 25 is selected.

The matching block 29 then calculates an Euclidian distance from each of the standard parameters listed in the selected standard parameter table and the integrated parameter from the integrated parameter construction unit 26 and releases as the result of voice recognition a sound element attributed to the standard parameter which yields the smallest of the Euclidian distance.

Accordingly, the voice recognition apparatus of the embodiment permits the voice of a user to be recognized not only from the voice data picked up by the microphone 11 mainly as speech of the user but also from the image data pictured by the CCD camera 12, such as the motion of the mouth of the user, the audio data picked up by the microphone 13, and the other data detected by the sensor 14 such as different types of noise and different bands of frequency, hence increasing the rate of recognition.

Also, the apparatus allows a corresponding standard parameter pattern corresponding to the class determined by two or more data supplied from the input unit 10 to be selected from a group of the standard parameter tables which are assigned to their respective classes. As the optimum standard pattern table for recognition of the voice of the user is obtained from two or more data supplied from the input unit 10, the rate of recognition can be more increased.

Figure 4:
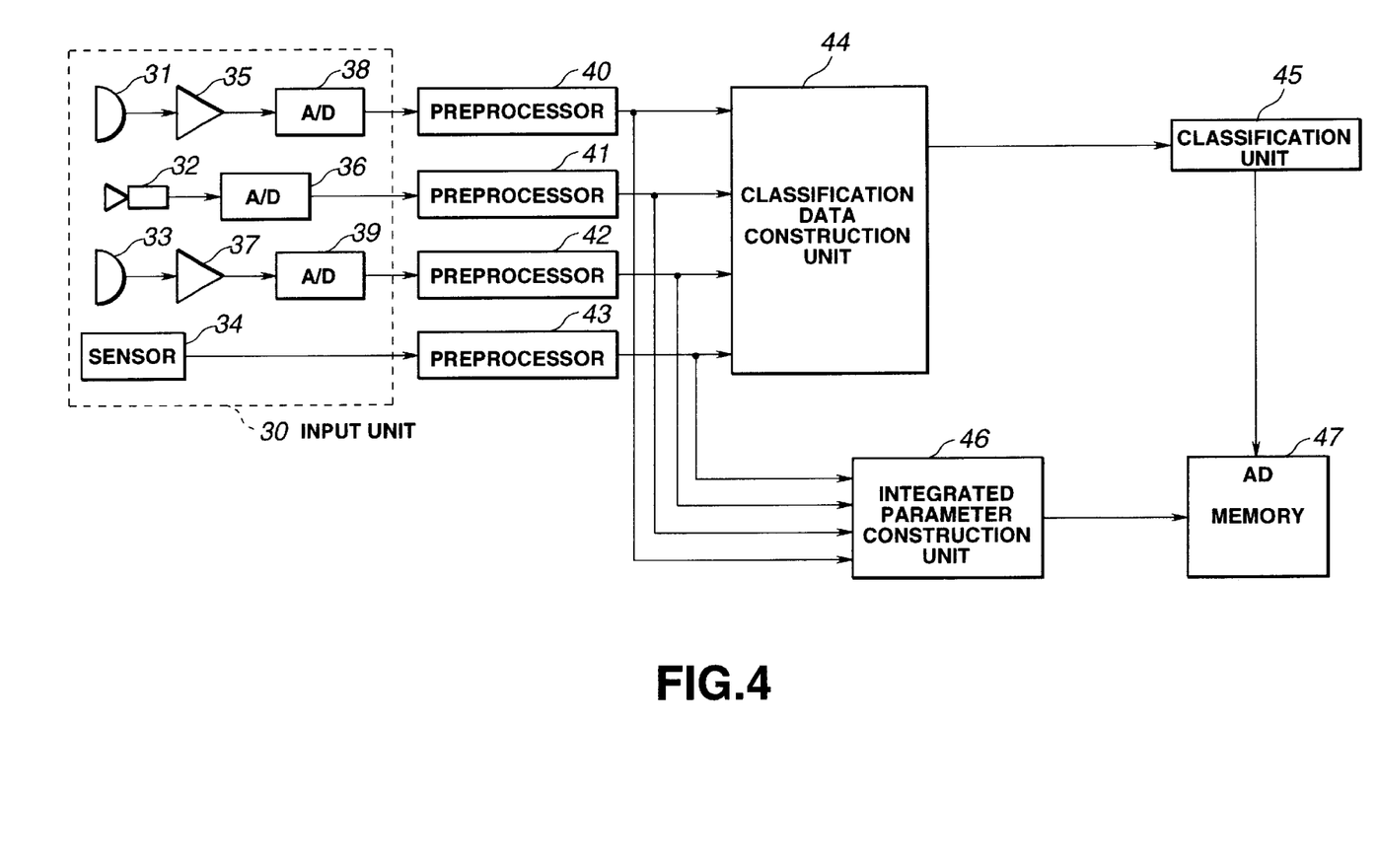
FIG. 4 is a block diagram of an arrangement of a first embodiment of a learning apparatus according to the present invention.

FIG. 4 illustrates an arrangement of a learning apparatus for using a learning process to determine the standard parameters which are registered to the standard parameter table of each class in the standard parameter memory 28 shown in FIG. 2.

There are provided an input unit 30 (including a microphone 31, a CCD camera 32, a microphone 33, a sensor 34, an amplifier 35, an A/D converter 36, an amplifier 37, and A/D converters 38 and 39), preprocessors 40 to 43, a classification data construction unit 44, a classification unit 45, and an integrated parameter construction unit 46 which are identical in construction to the input unit 10 (including the microphone 11, the CCD camera 12, the microphone 13, the sensor 14, the amplifier 15, the A/D converter 16, the amplifier 17, and the A/D converters 18 and 19), the preprocessors 20 to 23, the classification data construction unit 24, the classification unit 25, and the integrated parameter construction unit 26 respectively in the voice recognition apparatus shown in FIG. 2. A memory 47 is provided with an address terminal (AD) for receiving the class as an address from the classification unit 45 and can save the integrated parameter supplied from the integrated parameter construction unit 46.

In the learning apparatus having the above mentioned arrangement, learn data for learning process are introduced into the input unit 30. More specifically, the voice of a speaker is picked up by the microphone 31. At the time, the mouth of the speaker is pictured by the CCD camera 32. Moreover, the microphone 33 picks up e.g. engine sound of vehicles, music sound from a CD player, sound of raining, operating sound of an air-conditioner, and other ambient noise. The sensor 34 can detect levels of the vibration and when the microphone 33 picks up the sound of raining, degrees of the temperature and the moisture under the raining.

The learn data received by the input unit 30 are then processed in the preprocessors 40 to 43, the classification data construction unit 44, the classification unit 45, and the integrated parameter construction unit 46 by the same manners as those of the preprocessors 20 to 23, the classification data construction unit 24, the classification unit 25, and the integrated parameter construction unit 26 shown in FIG. 2. As the result, the memory 47 is supplied with a class from the classification unit 45 and an integrated parameter from the integrated parameter construction unit 46.

The memory 47 saves the integrated parameter from the integrated parameter construction unit 46 as a standard parameter in an address assigned to the class from the classification unit 45.

Such a process is carried out over each sound element produced by the speaker with variations of noise and data input picked up by the microphone 33 and the sensor 34.

Accordingly, a group of the integrated parameters of each class are saved in the corresponding address of the memory 47.

The integrated parameters (of the group) allocated to each address of the memory 47 are then saved in the standard parameter memory 28 shown in FIG. 2 as the standard parameters in a standard parameter table of the class.

In the learning apparatus, a data produced with the microphone 33 receiving a noise and a data produced without such a noise are classified to different classes by the classification unit 45. As the result, an optimum standard parameter table with the noise and an optimum standard parameter table without the noise are constructed. This allows the voice recognition apparatus shown in FIG. 2, which releases a class from the classification unit 25 identical to the class from the classification unit 45, to select the optical standard parameter table when the noise is input or the other optical standard parameter table when the noise is not input.

Also, in the learning apparatus, the standard parameters may be classified into classes depending on not only the presence and absence of noise but also types and levels of the noise, types of sound element produced by the speaker, and sexuality, male or female, of the speaker. The manner of classification over the standard parameters however is not a critical issue. When the input data of the input unit 10 in the voice recognition apparatus is identical to that of the input device 30 in the learning apparatus, the result of classification by the classification unit 25 in the voice recognition apparatus is identical to that by the classification unit 45 in the learning apparatus. Accordingly, the standard parameters determined by the input data of the input unit 10 or the optimum standard parameters to the input data can be used for voice recognition in the voice recognition apparatus.

It may be allowed in the learning apparatus shown in FIG. 4 that a group of the integrated parameters of each class over a sound element are saved in the memory 47. More particularly, for learning, with a speaker yielding each sound element under different noise conditions and a plurality of speakers doing the same, the resultant integrated parameters may be scattered over specific regions in a parameter space.

Figure 5:
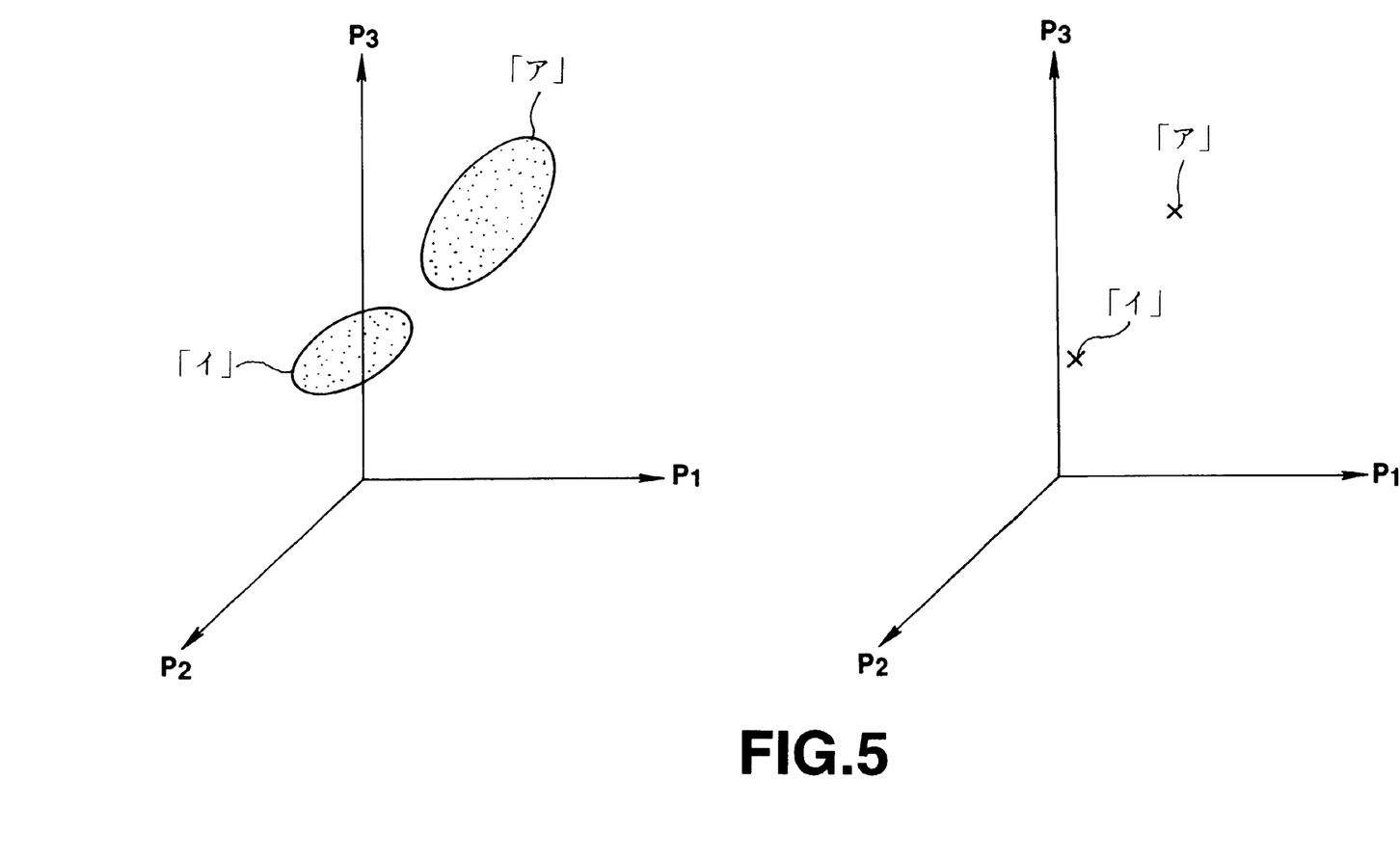
FIG. 5 is a diagram showing a parameter space.

For example, FIG. 5(A) shows a three-dimensional parameter space where the integrated parameter is expressed by three components $P_1$, $P_2$, and $P_3$ for ease of explanation. When the integrated parameters of sound elements "ア" and "イ" in one class are plotted, they are grouped in specific regions of the parameter space.

Although all points in the region may be regarded as the standard parameters of each sound element, it is preferable to determine a barycenter in the region which is then treated as the standard parameter of the sound element as shown in FIG. 5(B).

Figure 6:
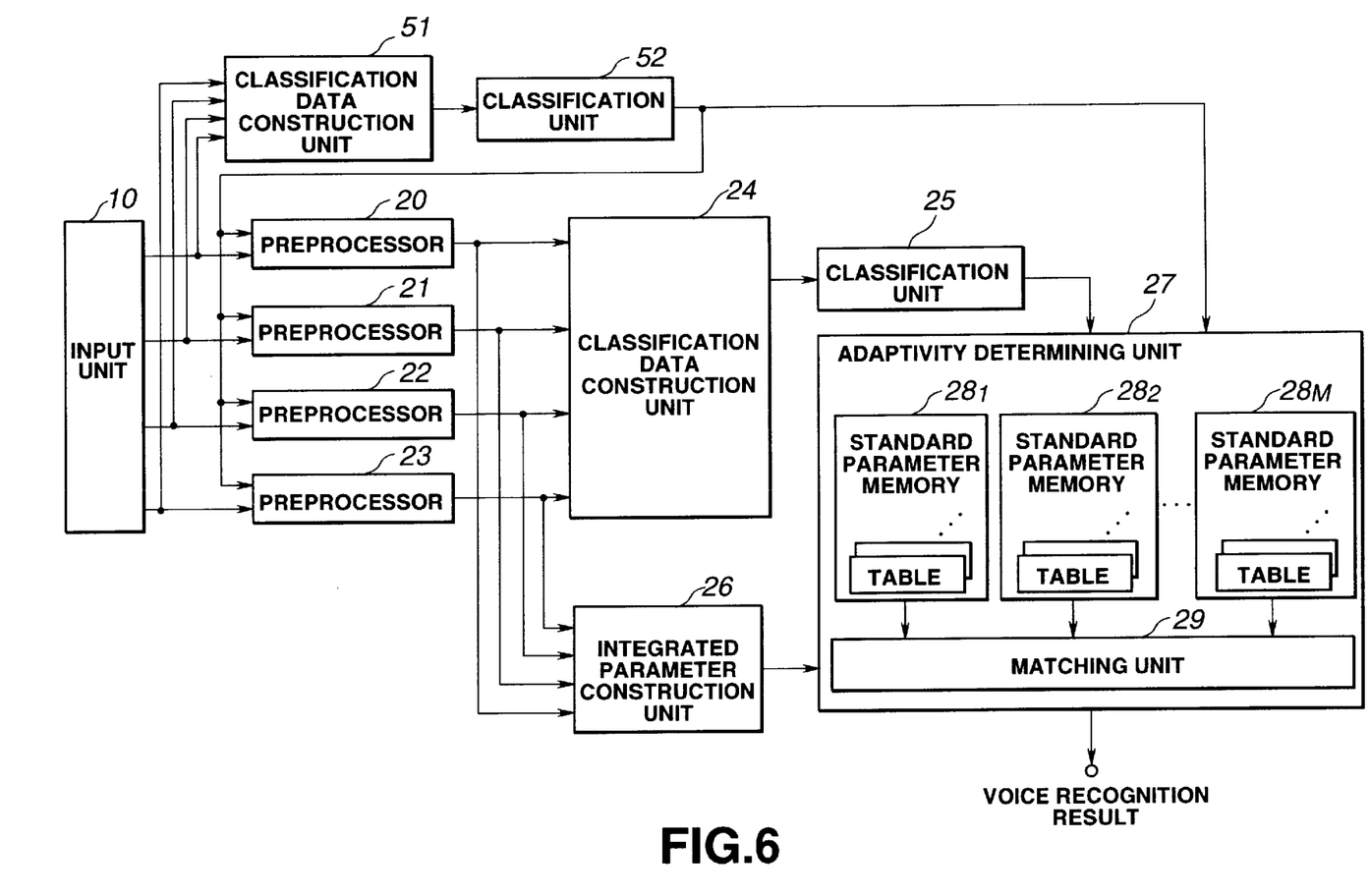
FIG. 6 is a block diagram of an arrangement of a second embodiment of the voice recognition apparatus according to the present invention.

FIG. 6 illustrates an arrangement of a second embodiment of the voice recognition apparatus provided with the input unit 4 shown in FIG. 1. In the figure, like components are denoted by like numerals as those shown in FIG. 2 and their explanation will be omitted hereinafter. In brief, the voice recognition apparatus of the second embodiment is substantially identical in construction to the voice recognition apparatus shown in FIG. 2 except that the standard parameter memory 28 is substituted by a group of standard parameter memories $28_1$ to $28_M$ and a classification data construction unit 51 and a classification unit 52 are added.

The classification data construction unit 51 constructs a classification data from a plurality of data supplied by the input unit 10 and delivers it to the classification unit 52. The classification unit 52 classifies the classification data from the classification data construction unit 51 to a corresponding class which is then transferred as the result of classification to the preprocessors 20 to 23.

In the preprocessors 20 to 23, preprocess actions suited for the class from the classification unit 52. More particularly, when the voice data picked up by the microphone 11 contains more vocal sounds such as vowels, linear predictive coefficients and cepstrum coefficients are more preferable to identify the voice than zero-cross values. When the voice data picked up by the microphone 11 contains more voiceless sounds such as consonants, zero-cross values and power levels in different frequency bands, and duration of consonant are more favorable than linear predictive coefficients and cepstrum coefficients. When the level of noise received by the microphone 13 is low, its effect will be disregarded. But, if the level of noise is high, its effect should be concerned in the voice recognition. When the mouth of a user exhibits less or no motion, its motion vector may be unnecessary. If the mouth creates a degree of motion, its motion vector should be considered in the voice recognition. Furthermore, when no or less vibration of a vehicle is generated or it is not raining, the output of the sensor 14 may be negligible. In the opposite case, the output of the sensor 14 should count in the voice recognition.

It is hence true that the characteristic parameters optimum for the voice recognition (for having a result of recognition at a higher accuracy) are varied depending on the other factors, not to say the voice itself to be recognized.

In the voice recognition apparatus shown in FIG. 6, the classification data is constructed from data outputs of the input unit 10 and then classified into classes. Then, the optimum characteristic parameters for each class can be determined by the preprocessors 20 to 23.

According to the embodiment shown in FIG. 6, the parameter space for calculating a distance in the adaptivity determining unit 27 (the matching unit 29) is modified according to the class defined by the classification unit 52. The distance in the parameter space corresponding to the class provided from the classification unit 52 is computed by the adaptivity determining unit 27 and a result of the voice recognition is produced from the distance.

It is assumed herein that the classification data from the classification data construction unit 51 are classified by the classification unit 52 into an M number of classes.

The preprocessors 20 to 23 for determining the characteristic parameters corresponding to the classes defined by the classification unit 52 may be adapted to vary the degree of the characteristic parameter (for example, a linear predictive coefficient of the eighth or twelfth degree) or to cancel the output of the characteristic parameters (for example, when the vehicle stands still in a quiet location and thus, the outputs of the microphone 13 and the sensor 14 are negligible, the preprocessors 22 and 23 can remain inactivated).

The class defined by the classification unit 52 is also transferred to the adaptivity determining unit 27 as well as the preprocessors 20 to 23. The adaptivity determining unit 27 includes the M standard parameter memories $28_1$ to $28_M$, as described previously, which hold the standard parameters in their respective parameter spaces corresponding to the M classes defined by the classification unit 52.

The standard parameter memories $28_m$ (m=1, 2, ..., M) like the standard parameter memory 28 shown in FIG. 2 also save the standard parameter tables of their corresponding classes defined by the classification unit 25.

The standard parameter tables saved in the standard parameter memories $28_1$ to $28_M$, can be calculated by the learning process of another learning apparatus (FIG. 7) described later.

The adaptivity determining unit 27 upon receiving the class from the classification unit 52 selects one of the standard parameter memories $28_1$ to $28_M$ which corresponds to the class (and is thus referred to as a standard parameter memory $28_{ms}$).

The characteristic parameters from the preprocessors 20 to 23 are transferred via the classification data construction unit 24 to the classification unit 25 where they are classified. The class as the result of classification is then supplied to the adaptivity determining unit 27. Also, the characteristic parameters from the preprocessors 20 to 23 are transferred to the integral parameter construction unit 26 where they are shifted to an integral parameter. The integrated parameter is constructed by the integral parameter construction unit 26 from the characteristic parameters which are allocated in the parameter space identical to that of the standard parameters listed in the standard parameter table saved in the standard parameter memory $28_{ms}$ selected by the adaptivity determining unit 27.

The integrated parameter constructed by the integrated parameter construction unit 26 is transferred to the adaptivity determining unit 27. In the adaptivity determining unit 27, one of the standard parameter tables saved in the standard parameter memory $28_{ms}$ is selected according to the class defined by the classification unit 25 and the distance between each of the standard parameters listed in the selected standard parameter table and the integrated parameter received from the integrated parameter construction unit 26 is calculated by the matching unit 29. The sound element of the standard parameter of which distance is the smallest to the integrated parameter is thus released as a result of the voice recognition.

Accordingly, the preprocess action is carried out according to the class defined by the classification unit 52 to determine an optimum characteristic parameter. This allows the result of the voice recognition to be calculated at a higher accuracy from the distance of the optimum characteristic parameter in the parameter space.

Figure 7:
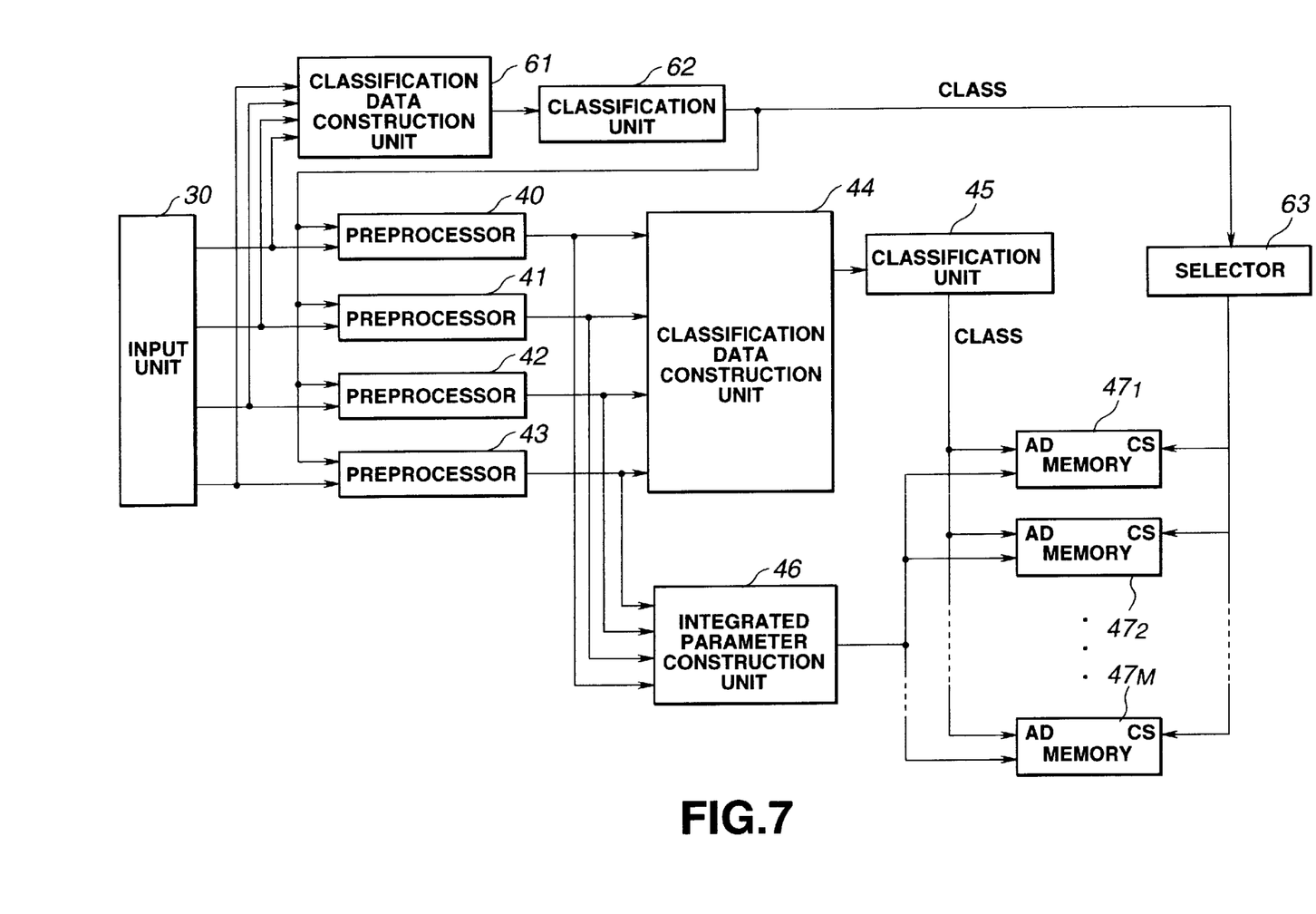
FIG. 7 is a block diagram of an arrangement of a second embodiment of the learning apparatus according to the present invention.

FIG. 7 illustrates an arrangement of a learning apparatus for performing a learning process to determine the standard parameters to be listed in the standard parameter table of each class saved in each of the standard parameter memories $28_1$ to $28_M$ shown in FIG. 6.

In the figure, like components are denoted by like numerals as those shown in FIG. 4 and their explanation will be omitted. The learning apparatus is substantially identical to that shown in FIG. 4 except that the memory 47 is replaced by a group of memories $47_1$ to $47_M$ and an additional set of a classification data construction unit 61, a classification unit 62, and a selector 63 are provided.

The classification data construction unit 61 and the classification unit 62 perform the same process actions as of the classification data construction unit 51 and the classification unit 52 respectively. The class determined by the classification is transferred to the preprocessors 40 to 43 and the selector 63. The preprocess action of the preprocessors 40 to 43 is identical to that of the preprocessors 20 to 23 shown in FIG. 6, whereby an optimum characteristic parameter corresponding to the class defined by the classification unit 62 is determined and released.

The classification data construction unit 44, the classification unit 45, and the integrated parameter construction unit 46 also perform the same process actions as of the classification data construction unit 24, the classification unit 25, and the integrated parameter construction unit 26 respectively. Accordingly, the class from the classification unit 45 and the integrated parameter from the integrated parameter constructing unit 46 are released.

The selector 63 in response to the class defined by the classification unit 62 feeds a select signal to any of the chip select (CS) terminals of the memories $47_1$ to $47_M$. A corresponding one of the memories $47_1$ to $47_M$ to the class supplied from the classification unit 62 is thus selected.

Also, the class defined by the classification unit 45 is fed to the address (AD) terminals of the memories. $47_1$ to $47_M$. This allows each integrated parameter from the integrated parameter construction unit 46 to be saved to a corresponding address to the class defined by the classification unit 45 in one of the memories $47_1$ to $47_M$ selected according to the class defined by the classification unit 62.

Accordingly, the integrated parameters (of a group) allocated to each address of one of the memories $47_1$ to $47_M$ are then saved in a corresponding one of the standard parameter memories $28_1$ to $28_M$ shown in FIG. 6 as the standard parameters in a standard parameter table of the class (defined by the classification unit 25).

It is also possible, as described with FIG. 5, that the barycenter of the group of the integrated parameters plotted in the space is saved as a standard parameter in each of the standard parameter memories $28_1$ to $28_M$ shown in FIG. 6.

Figure 8:
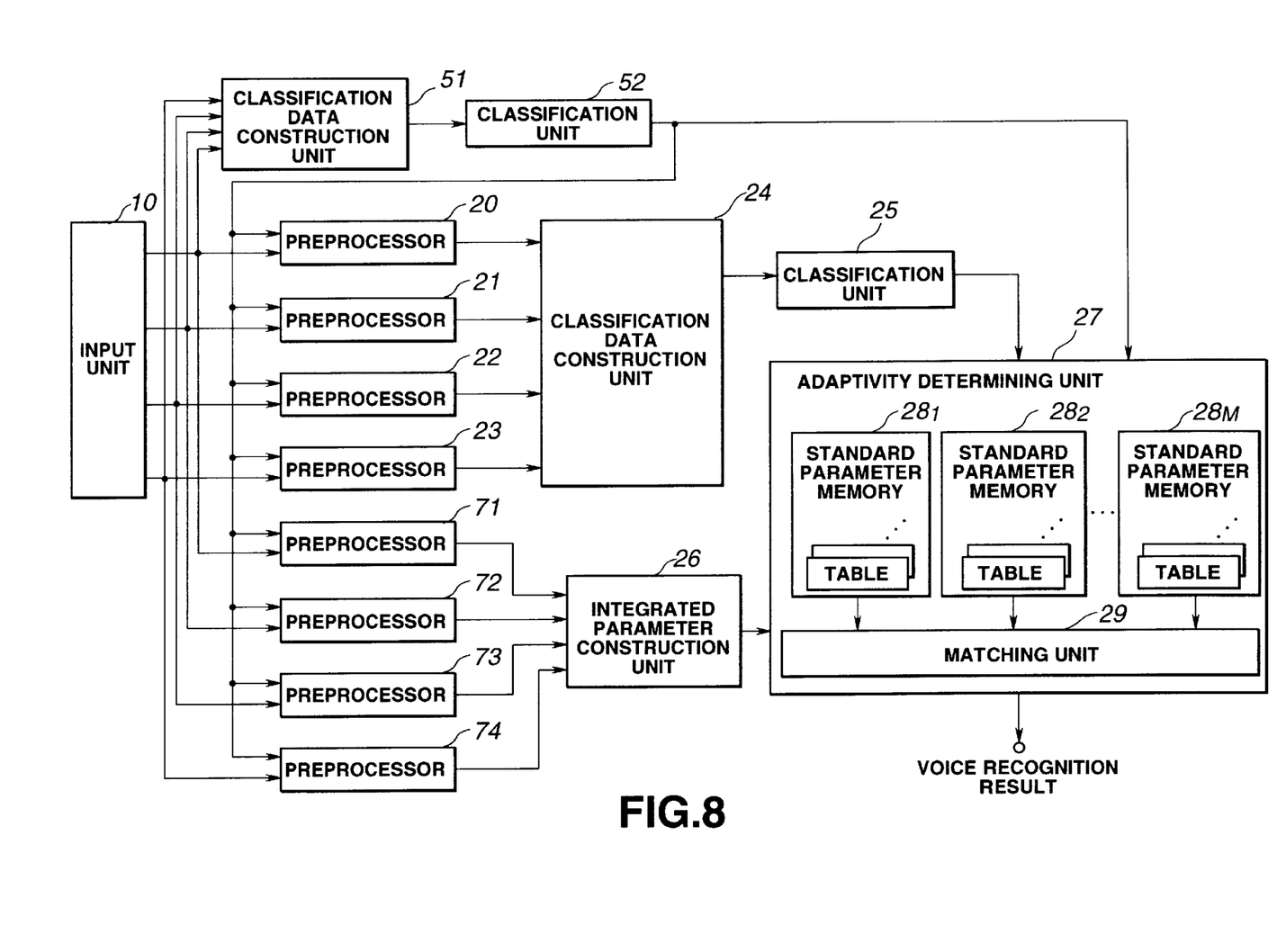
FIG. 8 is a block diagram of an arrangement of a third embodiment of the voice recognition apparatus according to the present invention.

FIG. 8 illustrates an arrangement of a third embodiment of the voice recognition apparatus provided with the input device 4 shown in FIG. 1. In the figure, like components are denoted by like numerals as those shown in FIG. 6 and their explanation will be omitted. The voice recognition apparatus of this embodiment is substantially identical to that shown in FIG. 6 except that extra preprocessors 71 to 74 are provided and their outputs replacing the outputs of the preprocessors 20 to 23 are supplied to the integrated parameter construction unit 26.

The preprocessors 71 to 74 receive the same data as received by the preprocessors 20 and 23. The class defined by the classification unit 52 is also supplied to the preprocessors 71 to 74.

The prepocessors 71 and 74 in response to the class received from the classification unit 52 carry out the pre-process action to determine optimum characteristic parameters which are transferred to the integrated parameter constructing unit 26. It is noted that the preprocess action of the preprocessors 71 to 74 is substantially different from that of the preprocessors 20 to 23. More particularly, while the outputs of the preprocessors 20 to 23 are used for ultimately determining the class in the classification unit 25, the outputs of the preprocessors 71 to 74 are shifted to the integrated parameter released from the integrated parameter construction unit 26. Hence, it is true that the optimum characteristic parameters used for classification of the classification unit 25 are calculated by the preprocessors 20 and 23 in accordance with the class defined by the classification unit 52 and simultaneously, the optimum characteristic parameters used for voice recognition are calculated by the preprocessors 71 and 74 in accordance with the class defined by the classification unit 52.

Figure 9:
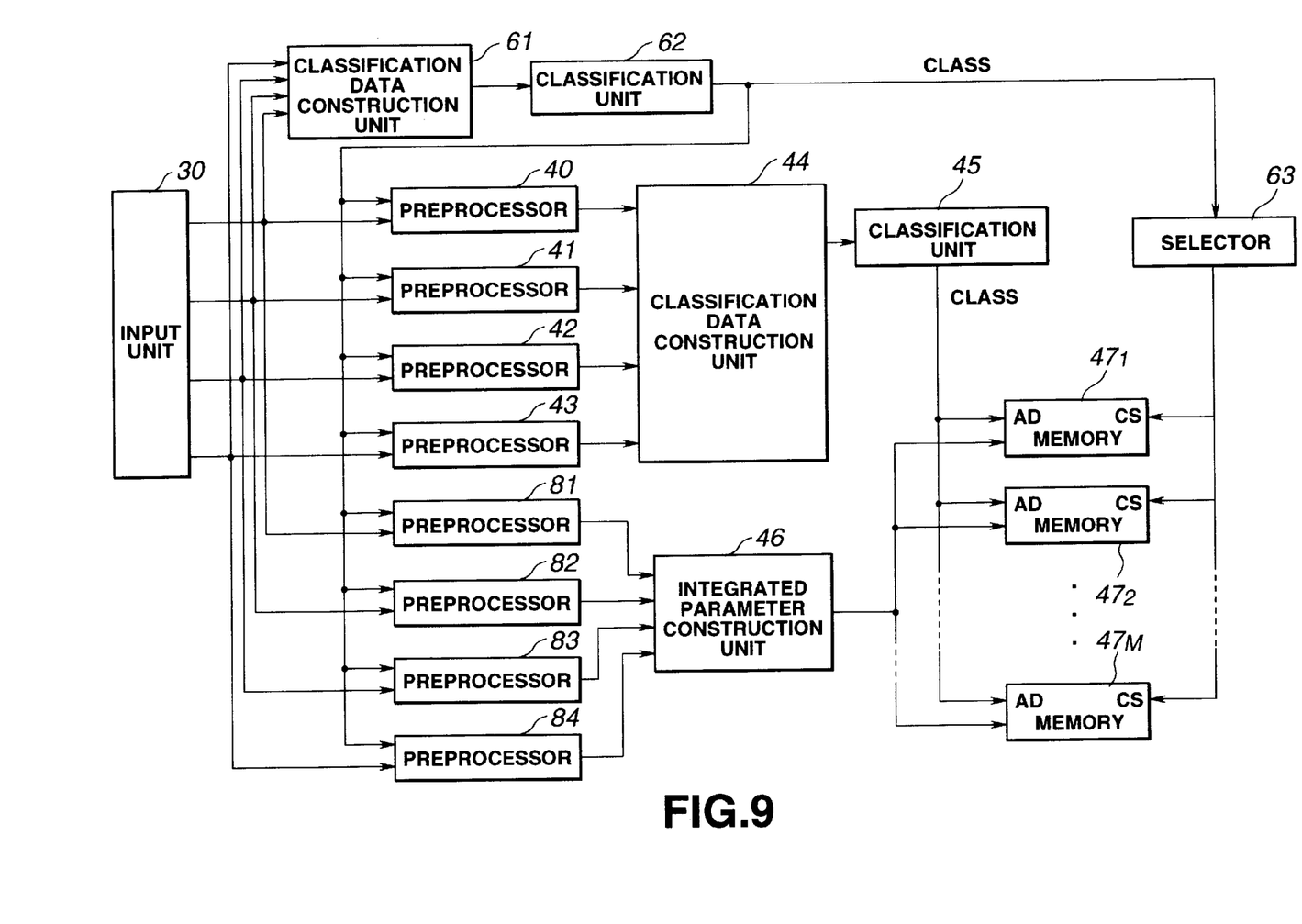
FIG. 9 is a block diagram of an arrangement of a third embodiment of the learning apparatus according to the present invention.

FIG. 9 illustrates an arrangement of a learning apparatus for performing a learning process to determine the standard parameters to be listed in the standard parameter table of each class saved in each of the standard parameter memories $28_1$ to $28_M$ shown in FIG. 8.

In the figure, like components are denoted by like numerals as those shown in FIG. 7 and their explanation will be omitted. The learning apparatus is substantially identical to that shown in FIG. 7 except that an extra set of processors 81 to 84 are provided and their outputs replacing the outputs of the preprocessors 40 to 43 are supplied to the integrated parameter construction unit 46.

In action, the optimum characteristic parameters used for classification of the classification unit 45 are calculated by the preprocessors 40 and 43, like the preprocessors 20 and 23 shown in FIG. 8, in accordance with the class defined by the classification unit 62 while the optimum characteristic parameters used for voice recognition are calculated by the preprocessors 81 to 84, like the preprocessors 71 and 74 shown in FIG. 8, in accordance with the class defined by the classification unit 62.

Although the integrated parameters determined by the learning process of the learning apparatus shown in FIG. 9 are saved in the standard parameter memories $28_1$ to the $28_M$ shown in FIG. 8, they may be saved not of all. It is also possible, as described with FIG. 5, that the barycenter of the group of the integrated parameters plotted in the space is saved as a standard parameter.

As the present invention is described above in the form of a voice recognition apparatus, it is also applicable to a similar apparatus for recognizing other subjects than the speech including images, characters, and human beings, Although the outputs of the CCD camera 32, the microphone 33, and the sensor 34 are used other than the voice of a user to be recognized, they are not of limitations.

Also, in the embodiment shown in FIG. 2, the classification data is constructed from data output of the preprocessors 20 to 23 and used for classification in the classification unit 25. The classification data may be constructed directly from outputs of the input unit 10 and used for classification in the classification unit 25.

Although the preprocessors 20 to 23, 40 to 43, 71 to 73, and 81 to 83 of the embodiments shown in FIGS. 6 to 9 are supplied with the class for carrying a preprocess action according to the class, they may be fed with a function related to the class so that they can perform an arithmetical operation using the function to execute the preprocess action in accordance to the class.

For simplifying the description of the embodiments, the voice recognition in the matching unit 29 is based on the distance between the integrated parameter and the standard parameter in an applicable parameter space. It is also possible for the matching unit 29 to calculate the distance between the standard parameter and the integrated parameter specified in a time sequence and the probability of appearance of such a time sequence which are then used for determining the result of the voice recognition. Moreover, the matching unit 29 may be provided with a variety of voice recognition algorithms assigned to the corresponding levels of the class defined by the classification units 25 and 52 for the voice recognition.

It is also understood that the voice recognition apparatuses illustrated in FIGS. 2, 6, and 8 and the learning apparatus illustrated in FIGS. 4, 7, and 9 may be implemented in the form of software applications for a microprocessor having a CPU and memories as well as the hardware installations.

Industrial Applicability

According to a recognition apparatus defined in claim 1 and a recognition method defined in claim 5, different types of input data are classified into classes depending on their characteristics and also, integrated to integrated parameters. Then, a subject is recognized using a combination of the integrated parameter and a table which carries standard parameters attributed to each class determined by the classification. As the table optimum for each case is used, the recognition will be increased in accuracy.

According to a learning apparatus defined in claim 6 and a learning method defined in claim 9, different types of input data are classified into classes depending on their characteristics and also, integrated to integrated parameters which are then classified according to each class determined the classification. This allows optimum parameters for the recognition to be constructed.

What is claimed is:

1. A recognition apparatus for recognizing a given subject from different types of input data, comprising:
a first classification data construction unit for constructing a first set of classification data from the different types of input data;
a first classification unit for classifying the different types of input data into a first class based on the first set of classification data from the first classification data construction unit;
preprocessing means for extracting a plurality of characteristic parameters from the different types of input data on the basis of said first class from said first classification unit;

a second classification data construction unit for constructing a second set of classification data based on the plurality of characteristic parameters from the preprocessing means;

a second classification unit for classifying the different types of input data into a second class based on the second set of classification data from the second classification data construction unit;

an integrated parameter construction unit for constructing an integrated parameter by integrating the plurality of characteristic parameters from the preprocessing means;

a plurality of standard parameter memories for storing a plurality of tables; each standard parameter memory corresponding to a predetermined first class; each table containing standard parameters corresponding to a predetermined second class; and a matching unit for recognizing the given subject by matching the integrated parameter with the standard parameters from the table corresponding to the second class and located in the standard parameter memory corresponding to the first class.

2. The recognition apparatus according to claim 1, wherein the given subject is a speaker of interest and the different types of input data include at least the voice of the speaker and an image of the speaker's mouth.

3. The recognition apparatus according to claim 1, wherein the different types of input data are collected by a corresponding plurality of different type sensors.

4. The recognition apparatus according to claim 1, wherein the preprocessing means comprises a first preprocessing means for extracting a first plurality of characteristic parameters for use by said second classification data construction unit, and a second preprocessing means for extracting a second plurality of characteristic parameters for use by said integrated parameter construction unit.

5. A method of recognizing a given subject from different types of input data, comprising the steps of:

constructing a first set of classification data from the different types of input data using a first classification data construction unit;

classifying the different types of input data into a first class based on the first set of classification data using a first classification unit;

extracting a plurality of characteristic parameters from the different types of input data on the basis of said first class from said first classification unit;

constructing a second set of classification data based on the plurality of characteristic parameters from the extracting step using a second classification data construction unit;

classifying the different types of input data into a second class based on the second set of classification data using a second classification unit;

constructing an integrated parameter by integrating the plurality of characteristic parameters from the extracting step; and recognizing the given subject by matching the integrated parameter with standard parameters corresponding to the first class and the second class; the standard parameters being stored in a plurality of standard parameter memories corresponding to predetermined first classes and containing a plurality of tables corresponding to predetermined second classes.

6. The method according to claim 5, wherein the given subject is a speaker of interest and the different types of input data include at least the voice of the speaker and an image of the speaker's mouth.

7. The method according to claim 5, wherein the different types of input data are collected by a corresponding plurality of different type sensors.

8. The method according to claim 5, wherein the extracting step comprises a first preprocessing step of extracting a first plurality of characteristic parameters for use by said second classification data construction unit, and a second preprocessing step of extracting a second plurality of characteristic parameters for use in said integrated parameter constructing step.

9. A voice command recognition system for operating a voice-activated system, comprising:

an input for receiving different types of input data from a plurality of corresponding input sensors; the different types of input data comprising voice audio data and at least one of ambient noise data and environmental conditions data;

a first classification data construction unit for constructing a first set of classification data from the different types of input data;

a first classification unit for classifying the different types of input data into a first class based on the first set of classification data from the first classification data construction unit;

an extractor for extracting a plurality of characteristic parameters from the different types of input data on the basis of said first class from said first classification unit;

a second classification data construction unit for constructing a second set of classification data based on the plurality of characteristic parameters from the extractor;

a second classification unit for classifying the different types of input data into a second class based on the second set of classification data from the second classification data construction unit;

an integrator for constructing an integrated parameter by integrating the plurality of characteristic parameters from the extractor;

a plurality of standard parameter memories for storing a plurality of tables; each standard parameter memory corresponding to a predetermined first class; each table containing standard parameters corresponding to a predetermined second class; and a recognizer for recognizing a command from a given person by matching the integrated parameter with the standard parameters from the table corresponding to the second class and located in the standard parameter memory corresponding to the first class.

10. The voice command recognition system according to claim 9, wherein the extractor extracts a first plurality of characteristic parameters for use by said second classification data construction unit and extracts a second plurality of characteristic parameters for use by said integrated parameter construction unit.

11. The voice command recognition system according to claim 9, wherein the extractor comprises a plurality of preprocessors corresponding to each of the different types of input data and for extracting said plurality of characteristic parameters.

12. The voice command recognition system according to claim 9, wherein said recognizer recognizes said command on the basis of the smallest Euclidian distance calculated from each of the standard parameters in the standard parameter table corresponding to said second class and the integrated parameter.

* * * * *